Aug. 15, 1961 A. R. BRAULT 2,995,826
WORK LAYOUT MEANS
Filed May 13, 1960 2 Sheets-Sheet 1
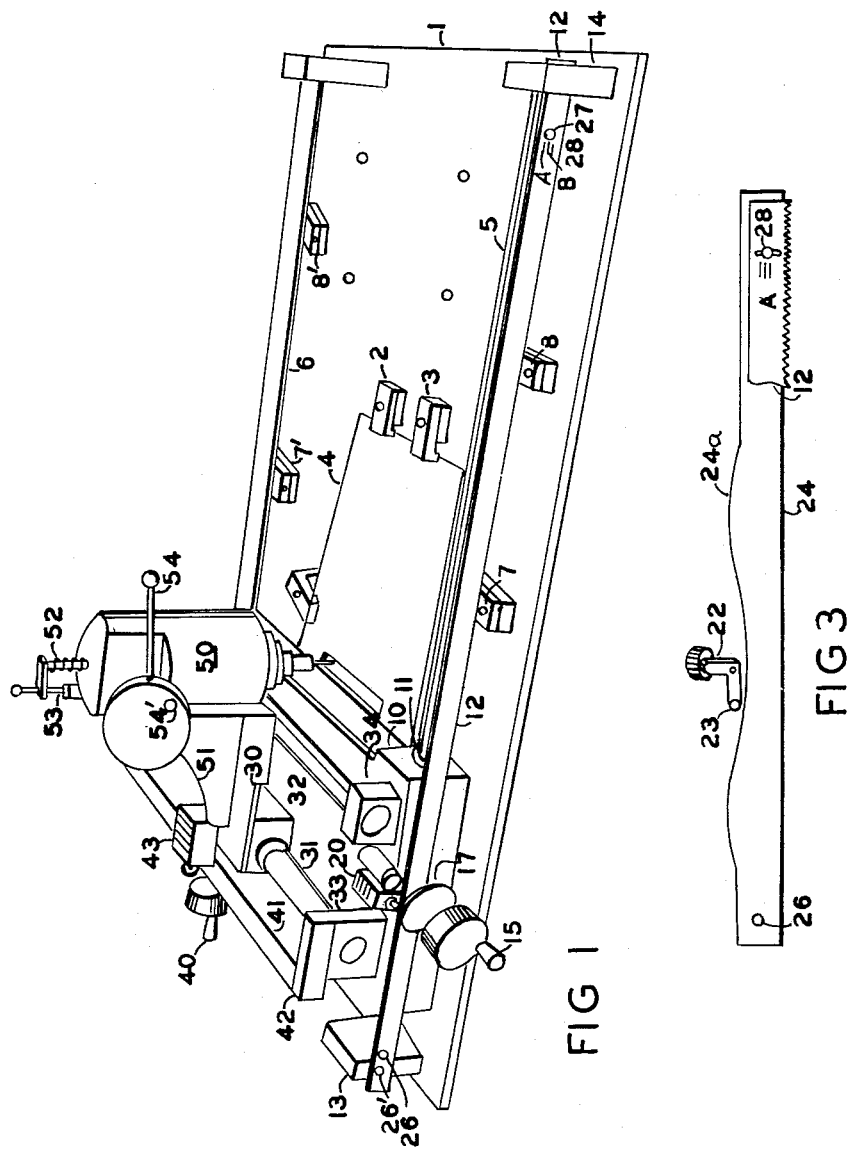
INVENTOR.
ANDRE R. BRAULT
BY James O. Malone Aug. 15, 1961  A. R. BRAULT  2,995,826
WORK LAYOUT MEANS
Filed May 13, 1960  2 Sheets-Sheet 2
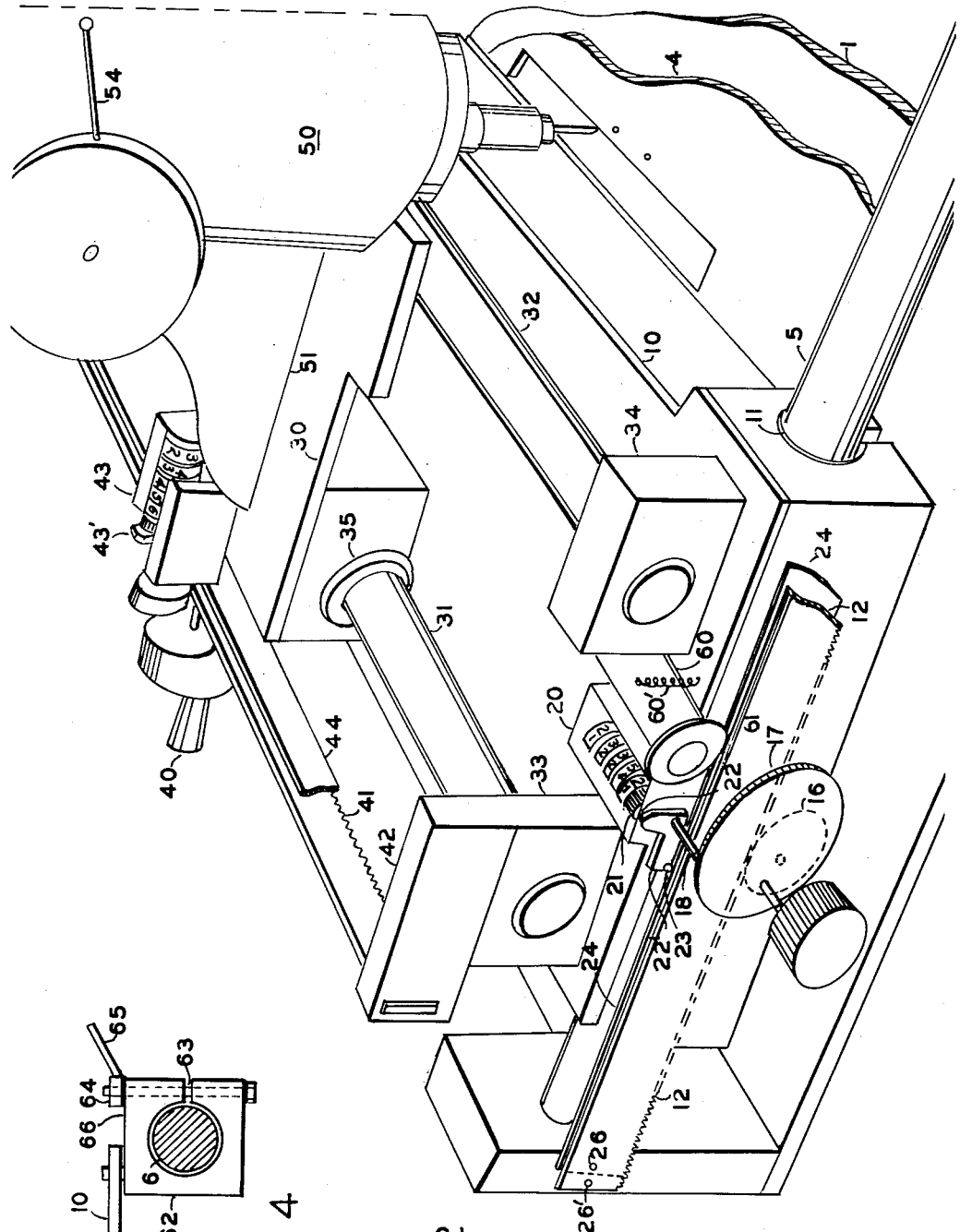
INVENTOR.
ANDRE R. BRAULT
BY James C. Malone

United States Patent Office 2,995,826
Patented Aug. 15, 1961

2,995,826
WORK LAYOUT MEANS
Andre R. Brault, North Merrick, N.Y., assignor to Optomechanisms, Inc., Mineola, N.Y.
Filed May 13, 1960, Ser. No. 29,052
4 Claims. (Cl. 33—189)

This invention relates to means for locating or laying out holes, cutting marks or other indicia on a workpiece, or in checking or inspecting such marks, holes, or indicia.

In the machinist's art it is very difficult, tedious and time consuming to accurately locate or lay out holes, cutting lines or other marks on a workpiece, for instance on dies, molds, templates or other accurately machined pieces. These marks are generally located with a machinist scale, T square, height gauge, or calipers and are subject to human error in reading the scales and positioning scales. When such lines or marks are made it is then customary for the craftsman to manually center-punch a starting point for the drilling tool at the intersection of the scribed lines. This procedure of necessity degrades the accuracy of location because it is a manual operation. Furthermore, after this center-punch mark is made it is extremely difficult to make the holes accurately because of all the further manual steps involved. Furthermore, such errors may have a cumulative effect. Also in respect to the accuracy herein discussed, a temperature variation during the time of laying out of the marks will also affect the accuracy.

The present invention solves these difficulties by providing very accurate means for locating or laying out such holes or marks in one operation. The present invention minimizes the human error in reading, by providing a digital type indicator and also provides temperature compensation with calibrated cams. The cams also compensate for inaccuracies in the indexing mechanism itself.

The present invention generally comprises a work table, a platform slidably mounted along one axis of the table and adapted to be indexed by means of a rack and pinion laid along said axis. A digital counter is mounted on the platform which is geared to the rack for direct reading. The counter has a vernier scale which is read against an index. The index is pivotally mounted and rides on a long cam which is pivotally mounted to the rack and extends along the rack. The cam is calibrated for temperature variation and also for inaccuracies in the rack and the indexing mechanism.

On the first platform is a second platform slidably mounted along an axis perpendicular to the first axis, also with a digital indicator and temperature compensator cam. On the second platform is mounted a small motorized drill for locating holes or marks. Alternatively a scribe or other indicating means may be attached thereto. Suitable means for locking the drill are provided.

Accordingly a principal object of the invention is to provide new and improved means for laying out or locating holes or other indicia on a workpiece.

Another object of the invention is to provide new and improved means for laying out or locating holes or other indicia on a workpiece with digital reading means.

Another object of the invention is to provide new and improved means for laying out or locating holes or other indicia on a workpiece with temperature compensation.

Another object of the invention is to provide new and improved layout means for machine work having high accuracy and minimum possibility of error.

Another object of the invention is to provide new and improved layout means for machine work having direct reading and temperature compensation.

Another object of the invention is to provide new and improved means for laying out machine work comprising a work table, a platform slidably mounted along two perpendicular axes over said work table, means to index said platform, digital reading means connected to said platform, the index of said digital reading means being compensated for temperature and mechanical errors.

These and other objects of the invention will be apparent from the following specification and drawings, of which FIG. 1 is a perspective view of the embodiment of the invention, FIG. 2 is a perspective view of a portion of the embodiment of FIG. 1, FIG. 3 is a detail illustrative view of the compensating cam means, greatly exaggerated, FIG. 4 is a detail view of the locking means.

Referring to the figures the invention generally comprises a work table 1 which may be a steel or aluminum plate having a series of holes for mounting adjustable clamps 2 and 3 for holding a workpiece 4. A pair of parallel bars 5 and 6 are mounted on each side of the work table in a parallel relation by means of adjustable mounting brackets 7, 8, etc. A platform 10 is slidably mounted on the bars 5 and 6 by means of bushing ball bearings 11 and a corresponding bearing on the other side. The platform 10 is indexed along the work table by means of the rack 12 which extends along the full length of the work table and which is mounted thereto by the brackets 13, 14. The rack 12 is slot mounted in bracket 14 to allow for temperature expansion and is pivotally mounted on bracket 13 by pin 26'. The platform is indexed along the rack by means of the handle 15 which is connected to gear 17 rotatably mounted on the platform 10, and geared to the rack 12 by means of the gear 16 (see FIG. 2) connected to the gear 17. The handle 15 shaft is also directly connected by means of the gear 17 which is connected to the pinion gear 18 which drives the digital counter 20 which is of the type having a scale 21. The index 22 for the scale is pivotally mounted on arm 22' on the shaft of the counter and contains a right angle extension having a cam follower 23 which rides on cam 24 which is a long bar having substantially the same length as the rack 12. The cam 24 is pivotally mounted to the rack 12 at one end at the point 26 and its pivotal position is adjusted at the other end of the rack 12 by means of the adjustment screw 27 (FIG. 1) which extends through a slot 28 in the rack 12.

In order to achieve movement along a second axis perpendicular to the first axis a second platform 30 is mounted on the first platform 10 with a similar arrangement comprising a pair of bars 31, 32 mounted in the brackets 33, 34 connected on the platform 10.

The platform 30 is mounted on the bars 31 and 32 by means of a ball bushing bearing 35 on bar 31 and a similar bearing on bar 32.

The second platform has similar means to move it comprising the handle 40 rotatably mounted on the platform 30 and directly geared to the rack 41 which is mounted along the second axis of movement perpendicular to the first axis by means of the brackets 42.

A second digital reader 43 is provided which is identical with the digital reader 20 having a similar scale and pivotally mounted index 43' having a cam follower which rides on the cam 44.

A motorized drill 50 is mounted in precision guides 51 with adjustable gibs connected to platform 30. The drill is normally spring loaded upward by means of the spring 52 and is controlled by the depth gauge 53. The drill press is operated up and down by means of the handle 54 connected to a conventional rack and pinion, not shown. The drill 50 preferably contains a very fine drill bit for making the marker holes. Alternatively, if it is desired to inscribe a line on the workpiece a pointed scribe may be inserted in the chuck of the drill press and a line may be made by moving either platform while holding the scribe in contact with the workpiece by means of the handle 54, or using a spring loaded marker and locking handle 54 in place, with lock 54'.

*Temperature compensation*

The cams are calibrated at a predetermined temperature by mounting a microscope on the drill head and laying a long machinist's vernier scale on the work table.

(1) The microscope is lined up with a mark on the low end of scale.

(2) The counter is then set to zero on index 22.

The apparatus is then cranked to the other end of the scale and set with the microscope against the scale on an even number of marks on the machinist's scale from the zero mark. If the index does not then give the proper reading the cam is adjusted up or down and set with adjustment screw 27 to indicate the proper reading on the counter.

The cam will be set at the factory at one or more predetermined temperatures, for instance 70° and 80°, and calibrating marks A, B will be inscribed for setting the cam at those temperatures. Similar calibrating marks may be made at any desired temperature.

Errors in the mechanism are also compensated by cutting the cam to compensate for them. For instance, there may be a variation in the spacing of the teeth of the rack 12. This may be compensated by making a series of accurate setting on the apparatus preferably with a microscope, and filing the cam so that the index 22 gives the proper readings. A pressure roller 60 is pivotally mounted on the platform 10 and spring loaded down against the rack 12 by spring 60' shown schematically. The pressure roller has an anti-friction ball bearing 61. There is a corresponding pressure roller on the other platform 30 bearing down against the rack 41. The purpose of the pressure rollers is to take up any looseness which may develop in the drive gearing and prevent backlash.

FIGURE 3 shows a detail view of the cam 24 and shows schematically the compensating movement of the index 22. The cam is pivotally mounted to the rack 12 at the point 26. The cyclic variation 24a in the cam surface, which is greatly exaggerated, may be used for instance to compensate for a cyclic inaccuracy in the spacing of the rack teeth or other mechanical inaccuracies. The cam follower 23 is spring loaded down against the cam surface 24a and will adjust the index according to the calibrations put into the cam by the cutting of the surface 24a. The temperature compensation is accomplished by pivoting the cam and clamping it to the rack by means of the adjustment screw 28. The device is preferably calibrated at the factory for a standard predetermined temperature such as 70° and a mark A inscribed on the rack 12 for this calibrated position. Additional calibrated marks may be inscribed for other temperatures. Due to the length of the cam this compensation is quite accurate.

FIG. 4 shows a detail of the locking arrangement for locking a movable platform to one of the mounting bars 6. The lock comprises a split block 62 which is mounted on the platform 10 and fits about the bar 6. The block 62 is adapted to be clamped to the bar 6 by means of the threaded bolt 63 and the internally threaded cam 64. The cam 64 has a handle 65 and has a sloping surface 66 in contact with the block 62 so that when the handle 65 is turned the cam nut 64 will exert pressure on the block 62 and clamp it to the bar 6. A second lock is preferably provided on the second platform 30.

The principal features and specifications of a typical embodiment of the machine may be summarized as follows:

(*a*) Digital readout of coordinate distances measured to a minimum accuracy of ±.0025 inches over the entire table area.

(*b*) The temperature or differential coefficient of expansion cams compensate readings for change in temperature from 70° to 90° Fahrenheit. This is accomplished by adjusting the cam surface to a calculated graduated scale on one end of the geared rack. This total slope in the cam is equal to the difference in the expansion of the materials to be bored out or coordinated with the material of the base plate of the machine. Example: The maximum slope angle is equal to the difference in expansion between aluminum or steel for a given length, say 24 inches, for a given ambient operating temperature above the calibrated temperature of 70°.

(*c*) The digital counter is equipped with a movable index or zero which is actuated by the cam, referred to in paragraph "*b*." However, this cam has an additional function. The surface of the cam which is in contact with the counter follower is shaped to compensate for sectional, cyclic, tooth to tooth, errors in the geared rack which is used to motivate the drilling head along the X and Y axes. As the counter movable index is actuated by the cam surface, its reading position is either retarded or advanced from zero set, so as to directly read a correct distance from actual zero start position. The cam surface is determined and machined from positions located on a master scale accurate to .001 inch and read with a 20 power microscope.

(*d*) The recorder indicating measured distances is a standard counter with the first wheel graduated into 50 divisions to read in increments of .002 inch per division with sub-spacing equal to .001 inch. As each increment is equal to .002 inch with 50 divisions per revolution, each linear .002 inch is equal to 7.2° of rotation of the counter wheel. It can readily be seen that a coarse adjustment to the cam surface can provide very accurate corrections for mechanical errors.

Movements on the X and Y axis is accomplished by rotating the hand wheels provided. Behind each of the hand wheels on the hub of the gear driving the counter pinion there is a zero adjustment. Zero adjustment is used for:

(*a*) Initial setting of zero when layout is made on a large plate and all holes are from a common reference point.

(*b*) Reset to zero for sets of hole locations anywhere within the measurable area.

(*c*) To lay out from a center line or lay out from established pilot hole.

(*d*) Relocation of zero point anywhere within the measurable area of the machine.

The rack used for moving the drilling head about the plate is anchored at one end only and in a floating position at the other end. The mean horizontal position of the pivot point is very accurately located with respect to the pinion of the hand wheel. The rack is made of steel with a coefficient of expansion of .000016 per inch per degree Fahrenheit. The slope of the cam is adjusted for steel at 70° F. at the factory for a machine of a given size. If it is desired to operate the machine at higher temperatures or compensate for differential expansion with other materials, simply adjust the total slope rise or fall in accordance with the calibrations on the machine. This is accomplished by loosening the cam holding screws and retightening.

This sound kinematic design coupled with the antibacklash arrangement provided by the pressure roller adjacent to the readout counter eliminates all possible mechanical errors due to looseness of parts.

The drilling or locating head is supported on precision anti-friction ball bearings, bushings and hardened steel rods. The initial combined tolerance on straightness and roundness of these rods is less than .0005 inch per foot per length of rod when the machine is assembled.

At assembly, during calibration, the adjustment screws 7, 7' and 8, 8' located under the rods 5, 6 are used for deflection purposes. By rotating the adjustment screws the rods are deflected to perfect straightness providing correct coordinate measurements. This adjustment is made against a master plate gauge and adjustment screws sealed.

During the life of the machine if adjustments should be found necessary, the seal may be broken and further adjustments made for wear. The rods supporting the X and Y axes can also be rotated within their mounts to correct for wear.

The drill head is preferably a dynamically balanced high speed motor with chuck being integral to the motor shaft. Chuck capacity is from 0 to ⅛ inch. The motor has variable speeds through a foot operated rheostat from 1200 r.p.m. to 17,000 r.p.m. The motor will automatically stall if used beyond capacity or material is too hard for size drill used. A depth gauge setting with lock knob is provided on the drill head for selecting the proper depth when drilling.

Many modifications may be made without departing from the scope of the invention which is defined by the following claims.

I claim:

1. Means for accurately laying out indicia on a workpiece comprising a work table, marking means slidably mounted on said work table and movable along two perpendicular axes, means to index said marking means along one of said axes comprising a rack mounted on said work table parallel one axis, a digital indicator connected to said marking means and geared to said rack, means to compensate said indicator for temperature variation comprising a long cam pivotally mounted at one end of said rack and adjustably connected to said rack at its other end, a scale on said indicator, and an index for said scale pivotally mounted on said indicator, said index having a cam follower riding on said cam.

2. Means for accurately laying out indicia on a workpiece comprising a work table, a platform slidably mounted on said work table and movable along an axis, means to index said platform along said axis comprising a rack mounted on said work table parallel said axis, said rack being fixedly mounted at one end and slidably mounted at its other end to permit expansion due to temperature, a digital indicator mounted on said platform and geared to said rack, and means to compensate said indicator for temperature and mechanical variation comprising a long bar cam pivotally mounted at one end of said rack and adjustably connected to said rack at its other end, a scale on said indicator, and an index for said scale pivotally mounted on said platform, said index having a cam follower riding on said cam.

3. Means for accurately laying out indicia on a workpiece comprising a work table, marking means slidably mounted on said work table and movable along two perpendicular axes, means to index said marking means along said axes comprising a pair of racks on said axes, a pair of digital indicators connected to said marking means and geared to said racks, and means to compensate said indicators for temperature and mechanical variation comprising a pair of long cams each pivotally mounted at one end of each of said racks and adjustably connected to one of said racks at its other end, a scale for each of said indicators and an index for each of said indicators pivotally mounted on said indicators, each of said indices having a cam follower riding on one of said cams.

4. Means for accurately laying out indicia on a workpiece comprising a work table, a first platform slidably mounted on said work table and movable along a first axis, means to index said platform along said first axis comprising a first rack mounted on said work table parallel said axis, said first rack being fixedly mounted at one end and slidably mounted at its other end to permit expansion due to temperature, a first digital indicator mounted on said platform and geared to said rack, and means to compensate said indicator for temperature and mechanical variation comprising a first long bar cam pivotally mounted at one end of said rack and adjustably connected to said rack at its other end, a scale on said indicator, an index for said scale pivotally mounted on said platform, said index having a cam follower riding on said cam, a second platform slidably mounted on said first platform and movable along a second axis perpendicular said first axis, means to index said second platform along said second axis comprising a second rack mounted on said first platform parallel said second axis, said second rack being fixedly mounted at one end and slidably mounted at its other end to permit expansion due to temperature, a second digital indicator mounted on said second platform and geared to said second rack, and means to compensate said second indicator for temperature and mechanical variation comprising a second long bar cam pivotally mounted at one end of said second rack and adjustably connected to said second rack at its other end, a scale on said second indicator, and a second index for said scale pivotally mounted on said second platform, said second index having a cam follower riding on said second cam.

References Cited in the file of this patent

UNITED STATES PATENTS

| | | |
|---|---|---|
| 2,353,726 | Guttman | July 18, 1944 |
| 2,448,473 | Shrewsbury | Aug. 31, 1948 |
| 2,949,881 | Berger | Aug. 23, 1960 |
| 2,956,344 | Rantsch | Oct. 18, 1960 |